United States Patent
Oulie

[11] Patent Number: 5,208,939
[45] Date of Patent: May 11, 1993

[54] WINDSHIELD WIPER BLADE AND A WIPING STRIP WITH STIFFENING ELEMENT THEREFOR

[75] Inventor: Michel Oulie, Issoire, France

[73] Assignee: Valeo Systemes d'Essuyage, Montigny-Le-Bretonneux, France

[21] Appl. No.: 950,755

[22] Filed: Sep. 24, 1992

Related U.S. Application Data

[63] Continuation of Ser. No. 641,851, Jan. 16, 1991, abandoned.

[30] Foreign Application Priority Data

Jan. 19, 1990 [FR] France ................................ 90 00632

[51] Int. Cl.⁵ ................................................ B60S 1/38
[52] U.S. Cl. ............................. 15/250.36; 15/250.42; 15/245
[58] Field of Search .......... 15/250.36, 250.42, 250.31, 15/250.32, 250.37, 250.38, 250.41, 250.05, 250.35, 250.40, 245

[56] References Cited

U.S. PATENT DOCUMENTS

| | | | |
|---|---|---|---|
| 1,748,755 | 2/1930 | Cogswell | 15/250.36 |
| 3,097,389 | 7/1963 | Contont et al. | 15/250.36 |
| 3,099,031 | 7/1963 | Ludwig | 15/250.42 |
| 3,107,384 | 10/1963 | Wise | 15/250.42 |
| 3,140,501 | 7/1964 | MacPherson | 15/250.36 |
| 3,541,629 | 11/1970 | Quinlan et al. | 15/250.42 |
| 4,271,558 | 6/1981 | D'Alba | 15/250.42 |
| 4,389,747 | 6/1983 | Riester | 15/250.42 |
| 4,442,566 | 4/1984 | Sharp | 15/250.42 |
| 4,566,147 | 1/1986 | Baerenwald et al. | 15/250.36 |
| 4,583,259 | 4/1986 | Will | 15/250.42 |

FOREIGN PATENT DOCUMENTS

| | | | |
|---|---|---|---|
| 2324702 | 12/1974 | Fed. Rep. of Germany . | |
| 3337815 | 3/1985 | Fed. Rep. of Germany . | |
| 2168837 | 8/1973 | France . | |
| 642460 | 7/1962 | Italy | 15/250.36 |
| 670922 | 4/1952 | United Kingdom | 15/250.36 |
| 749593 | 5/1956 | United Kingdom | 15/250.36 |
| 2051563 | 1/1981 | United Kingdom . | |
| 2144976 | 3/1985 | United Kingdom | 15/250.42 |
| 2189383 | 10/1987 | United Kingdom | 15/250.42 |
| 2202134 | 9/1988 | United Kingdom | 15/250.36 |

Primary Examiner—Harvey C. Hornsby
Assistant Examiner—Gary K. Graham
Attorney, Agent, or Firm—Dennison, Meserole, Pollack & Scheiner

[57] ABSTRACT

A wiping strip, in particular for a windshield wiper blade of an automotive vehicle, comprises a wiping lip and at least one stiffening element for stiffening the lip. The wiping lip and the stiffening element are secured together by clipping one within the other, by means of mutual interengaging means which are provided between the wiping lip and the stiffening element.

8 Claims, 1 Drawing Sheet

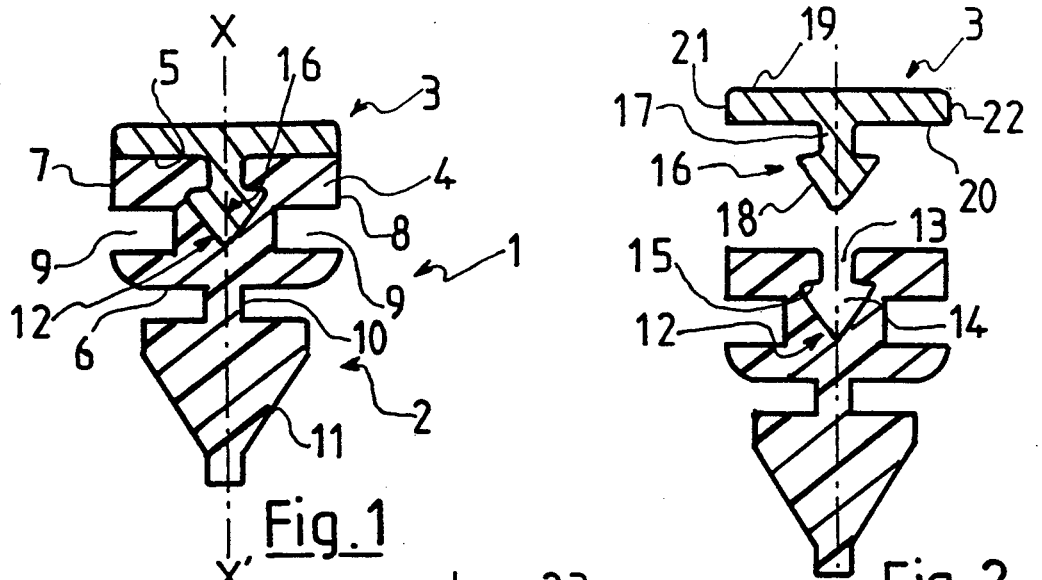
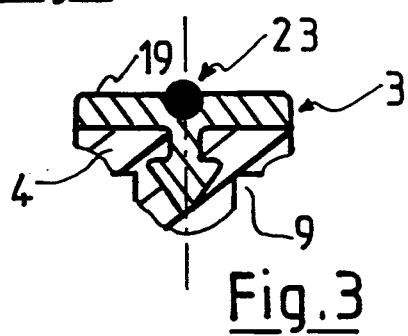
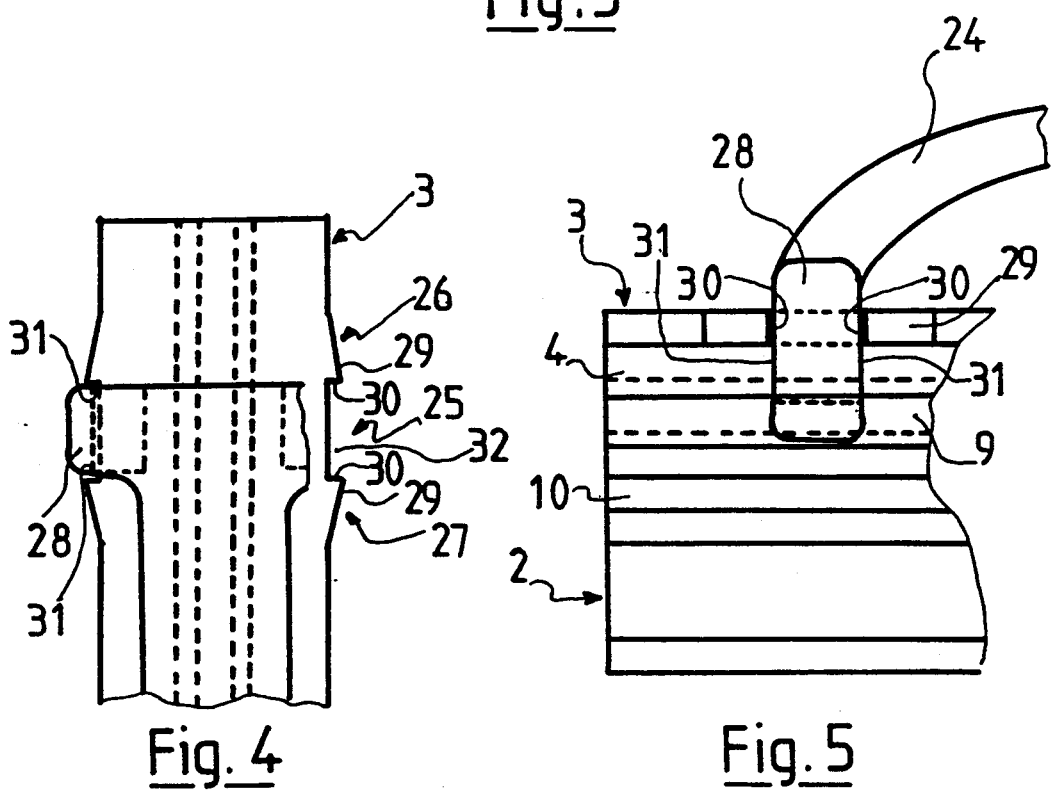

WINDSHIELD WIPER BLADE AND A WIPING STRIP WITH STIFFENING ELEMENT THEREFOR

This is a continuation of copending application Ser. No. 07/641,851 filed on Jan. 16, 1991 now abandoned.

FIELD OF THE INVENTION

This invention relates to a wiping strip for a windshield wiper, and to a windshield wiper having such a strip.

BACKGROUND OF THE INVENTION

Wiping strips for windshield wipers, as known at the present time, comprise a wiping lip of rubbery material, together with at least one stiffening element for stiffening the wiping lip. The wiping lip commonly comprises a base portion having two pairs of cavities, which extend longitudinally and which have a cross section in the form of a parallelepiped, these cavities being arranged on either side of the base portion. One of the two pairs of cavities serves to receive a stiffening element, which consists either of two metallic shims or webs arranged longitudinally on either side of the base portion, or a rod which overlies the upper part of the base portion. The free edges of the stiffening element cooperate with the pair of cavities mentioned above, while the other one of the pairs of cavities, disposed at a lower level than the first mentioned pair, serves to receive the gripping tabs normally provided on the mounting yoke for carrying the wiping strip.

The base portion is extended by a friction element for direct wiping engagement on a surface to be swept, the friction element being joined to the base portion through a neck zone which enables the friction element to undergo relative movement with respect to the base portion.

It has been found that such wiping strips have a number of drawbacks. Thus, assembly and fabrication operations are somewhat complicated and onerous. Indeed, in the case in which metallic strips are used as stiffening elements, these are generally given chemical treatment in order to protect them against oxidation: it is necessary to provide on the base portion, and/or on the metallic strips, locating means to immobilise one with respect to the others, in such a way as to prevent them from separating during the rest of the operative process.

Similarly, in the case in which the stiffening element is in the form of a rod, locating means are provided between the rod and the base portion in order to enable the assembly operations to proceed.

In addition, it is clear that the assembly operations are complex, partly because of the mounting of the stiffening element in the cavities that are provided for this purpose, and partly because of the need to use locating means between the stiffening element and the wiping lip.

DISCUSSION OF THE INVENTION

An object of the present invention is to overcome the drawbacks mentioned above by providing a wiping lip of very simple design and relatively low cost.

In accordance with the invention, a wiping strip for a windshield wiper, in particular for an automotive vehicle, comprising a wiping lip and at least one stiffening element for stiffening the said lip, is characterised in that a means for mutual inter-engagement by clipping is provided between the stiffening element and the wiping lip.

The invention enables the stiffening element to be immobilised with respect to the wiping lip, and the remainder of the assembly operations can then be pursued without any risk of possible separation of these two elements from each other.

The other features and advantages of the invention will appear more clearly from the following description, which is given by way of example only and with reference to the accompanying drawings.

BRIEF DESCRIPTION OF THE DRAWINGS

FIG. 1 is a view in transverse cross section, showing diagrammatically the profile of the wiping strip.

FIG. 2 is a partial view showing one of the elements of the wiping strip.

FIG. 3 shows a modified embodiment of the invention.

FIG. 4 is a partial longitudinal view of the wiping strip carried by one element of a carrier.

FIG. 5 is a view from the top with reference to FIG. 4.

DESCRIPTION OF PREFERRED EMBODIMENTS OF THE INVENTION

Referring first to FIGS. 1 and 2, the wiping strip 1 comprises a wiping lip 2 and a stiffening element 3 for the lip 2. The lip 2 comprises a base portion 4 which, in the example here described, is generally in the form of a parallelepiped with horizontal faces 5 and 6 and vertical faces 7 and 8. A longitudinal cavity, which is again in the form of a parallelepiped, extends from each of the vertical faces 7 and 8, having a flank open on that face. The function of the cavities 9 will be explained below.

The lower horizontal surface 6 of the base portion is extended by a neck zone 10 which is connected to a friction element 11. The latter is adapted to sweep a glazed surface in the usual way, the surface being for example that of a windshield of an automotive vehicle.

In the body of the base portion 4, a longitudinal recess 12 extends from the upper horizontal surface 5 of the base portion along the latter: the general vertical axis of symmetry of the recess 12 is coincident with the general vertical axis X—X' of the lip 2. The cross section of the recess 12 is generally arrowhead-shaped, and comprises a first opening 13, extending longitudinally and having a cross section in the form of a parallelepiped. This opening 13 leads, in the direction towards the friction element 11, into a second opening 14. The opening 14 is in the form of an arrowhead, the larger side 15 of which is wider than the side of the opening 13 with which it is coincident. The apex or point of the arrowhead defining the cross section of the second opening 14 is directed towards the friction element 11, but lies behind the neck zone 10.

The longitudinal recess 12 cooperates with a complementary projection 16 on the stiffening element 3 which clips into the recess. The projection 16 is of dimensions and direction substantially identical to those of the recess 12, that is to say it has a solid stem portion 17, with the portion 17 being extended by a solid triangular portion 18. The projection 18 is carried by the stiffening element 3, which is of a material more rigid than that of the material from which the lip 2 is made, and which may for example be a thermoplastic polymer. The shape of the stiffening element 3 is that of a longitudinal parallelepiped with its horizontal faces 19 and 20 and vertical faces 21 and 22.

The projection 16 extends from the lower horizontal face 20, of the stiffening element 3 and further extends along the whole length of the lip 2, to bear through its horizontal face 20 on the horizontal face 5 of the base portion 4 of the lip.

The projection 16 carried by the stiffening element 3 is preferably moulded integrally with the remainder of the element, though it is possible for it to be a separate component attached on to the face 5 of the stiffening element 3 by any appropriate means, for example by use of an adhesive, or by welding, by clipping engagement or in any other suitable way.

In order to assemble the windshield wiper wiping element 1, by clipping the lip 2 and the stiffening element 3 together, it is sufficient to cause the projection 16 to penetrate into the recess 12 of the base portion 4, so that the second section 18, in the form of an arrowhead, forces the vertical surfaces of the first opening 13 apart until the long side of the second section 18 coincides with the long side of the opening 14. This cooperation of the two long sides then prevents any possible separation of the stiffening element 3 from the wiping lip 2, while the stiffening element 3 also engages through its lower horizontal face 20 on the upper horizontal face 5 of the base portion 4.

In this way, an inter-engaging assembly is formed by clipping action between the stiffening element 3 and the wiping lip 2, this assembly being particularly reliable due to the cooperation of the two long sides as described above, ensuring that the wiping lip 2 is locked with respect to the stiffening element 3.

In order to give the assembly additional security, a band of adhesive may be applied, before assembly, in the region of the apex of the prismatic opening 14, so that when the prismatic section 18 penetrates into this opening, the adhesive is spread evenly along the surfaces of the cooperating section 18 and opening 14.

Similarly, if desired, enough adhesive may be applied within the prismatic opening 14 for the adhesive to be able to spread not only along the surfaces of the solid section 18 and opening 14, but also along the surfaces of the upper or first solid section 17 and the corresponding opening 13.

Further, the projection 16 may of course extend along the whole length of the lip 2, or alternatively it may extend only over parts of its length: for example it may be sections spaced apart regularly along the lip.

Reference will now be made to FIG. 3, which shows a modified embodiment, in which the stiffening element 3 includes a reinforcement 23, of metal or a composite material. The reinforcement 23 is disposed within the stiffening element 3, and more precisely lies along the axis of symmetry, in such a manner as to hinder flow of the stiffening element while in operation with the lip 2 as a wiping strip.

The reinforcement 23 is in the form of a solid longitudinal cylinder which may extend wholly or partially along the stiffening element 3, though it may take any other possible form, such as that of a web for example. The reinforcement 23 is fixed to the stiffening element 3 in any appropriate way, for example by adhesive attachment or by clipping attachment. Alternatively, in the case in which the stiffening element 3 is extruded, the reinforcement 23 may be co-extruded with it.

Reference will now be made to FIGS. 4 and 5, which show the arrangement of the wiping strip on a mounting 24, so as to constitute with the latter a windshield wiper blade. FIGS. 4 and 5 show only one single element of this mounting, which is more commonly called a yoke and which includes gripping tabs 28 for cooperating with the cavities 9 of the lip 2 so as to hold the wiping strip.

To this end, on each vertical face 22, 23 of the stiffening element 3, a lengthwise stop means 25 is provided between the mounting 24 and the wiping strip. The stop means 25 comprises two projections 26 and 27 which extend outwardly and which are spaced apart facing each other. The distance between the two projections 26 and 27 is at least equal to the width of the gripping tabs 28 of the yoke 24.

The projections 26 and 27 are triangular in shape as can be seen from FIG. 4. The hypotenuse 29 of the triangle serves as a sliding ramp for the tabs 28 during assembly, while the short side 30 of the triangle forms an end stop for engagement with the corresponding transverse face 31 of the corresponding tab 28.

Thus, during assembly, the gripping tabs 28 of the mounting element 24 of the yoke slide into the longitudinal cavities 9 which are formed on the base portion 4, until they come into contact with the corresponding ramps 29 of the stop projection 26 or 27. As this movement is continued, the gripping tabs 28 become trapped in the free space 32 between the two stop faces 30.

The invention is not limited to the embodiments described above, but embraces all variants. In particular, the stiffening element 3 may have any other cross section, for example a U-shaped cross section in which the arms of the U would come into cooperating engagement partly with the vertical faces 7 and 8 of the base portion 4.

In addition, the shape of the central recess 12 and that of the corresponding projection 16 may take any other form, such as that in which a multiplicity of triangular shapes extend from a central vertical element.

What is claimed is:

1. A wiper blade assembly including an elongated wiping lip (2) comprising a base portion (4) having an upper horizontal face (5) and a lower horizontal face (6) joined by a pair of vertical faces (7, 8), a pair of opposed cavities (9) in said vertical face for receiving a supporting structure, a flexible neck (10) connected to said lower face, a wiping friction element (11) for engaging a surface to be wiped connected to said neck for pivotal motion with respect to said base, and a stiffening element (3) coextensively mounted to and lying in contact with said upper horizontal face of said base, and means securing said stiffening element to said base, said securing means comprising a longitudinal groove (12) in said base and a rib (16) depending from said stiffening element, said rib being frictionally received in said groove whereby lateral flexing of said wiping lip is prevented by paid stiffening element.

2. The assembly of claim 1 wherein said groove and said rib each have the cross sectional shape of an arrowhead.

3. The assembly of claim 2 wherein said stiffening element comprises an upper horizontal face (19), a lower horizontal face (20) and a pair of vertical faces (21, 22), said rib extending from a medial portion of said lower horizontal face.

4. The assembly of claim 3 including a separate reinforcing element bonded to a medial portion of said upper horizontal face.

5. The assembly of claim 4 wherein said reinforcing element and said rib lie on the symmetrical axis of said wiper strip.

6. The assembly of claim 3 including a plurality of detent means (25) integrally formed in opposed relationship on said vertical faces of said stiffening element, each said detent means comprising a pair of spaced triangular shaped projections (26, 27) defining a locating space (32) therebetween.

7. The assembly of claim 6 including at least one mounting yoke (24) at opposite ends thereof, said mounting yoke including gripping tabs engaging the opposed cavities (9) in said base, and upon sliding motion of said wiper strip, said gripping tabs mounting yoke including gripping tabs are expanded by said projections (26, 27) serving as ramps to be indexed in said spaces (32).

8. The assembly of claim 7 wherein said cavities (9) lie wholly within base (4). m

* * * * *